(12) United States Patent
Campos et al.

(10) Patent No.: US 8,457,146 B2
(45) Date of Patent: Jun. 4, 2013

(54) METHOD AND SYSTEM OPERABLE TO FACILITATE SIGNAL TRANSPORT OVER A NETWORK

(75) Inventors: Luis Alberto Campos, Superior, CO (US); Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 297 days.

(21) Appl. No.: 12/954,079

(22) Filed: Nov. 24, 2010

(65) Prior Publication Data

US 2011/0134935 A1    Jun. 9, 2011

Related U.S. Application Data

(60) Provisional application No. 61/266,653, filed on Dec. 4, 2009.

(51) Int. Cl.
*H04J 4/00* (2006.01)

(52) U.S. Cl.
USPC ........... 370/436; 370/431; 370/449; 370/346; 370/468

(58) Field of Classification Search
USPC ............... 370/436, 431, 449, 389, 392, 468, 370/469, 345
See application file for complete search history.

(56) References Cited

U.S. PATENT DOCUMENTS

| | | | |
|---|---|---|---|
| 7,298,728 B2* | 11/2007 | Golla et al. | 370/347 |
| 2007/0116007 A1* | 5/2007 | Xiao et al. | 370/395.4 |
| 2007/0291692 A1* | 12/2007 | Choi et al. | 370/330 |
| 2008/0228878 A1* | 9/2008 | Wu et al. | 709/205 |
| 2009/0161660 A1* | 6/2009 | Huang et al. | 370/352 |
| 2009/0232122 A1* | 9/2009 | Suda et al. | 370/345 |
| 2010/0214916 A1* | 8/2010 | Wu et al. | 370/230 |

* cited by examiner

*Primary Examiner* — Ricky Ngo
*Assistant Examiner* — Rasheed Gidado
(74) *Attorney, Agent, or Firm* — Great Lakes Intellectual Property, PLLC.

(57) ABSTRACT

A method and system operable to implement a multiple range, and optionally one-dimensional, transport scheduling process suitable to facilitate signal transport over a network for a variety of traffic types with different service requirements where two-dimensional mapping across frequency and/or time is required.

13 Claims, 4 Drawing Sheets

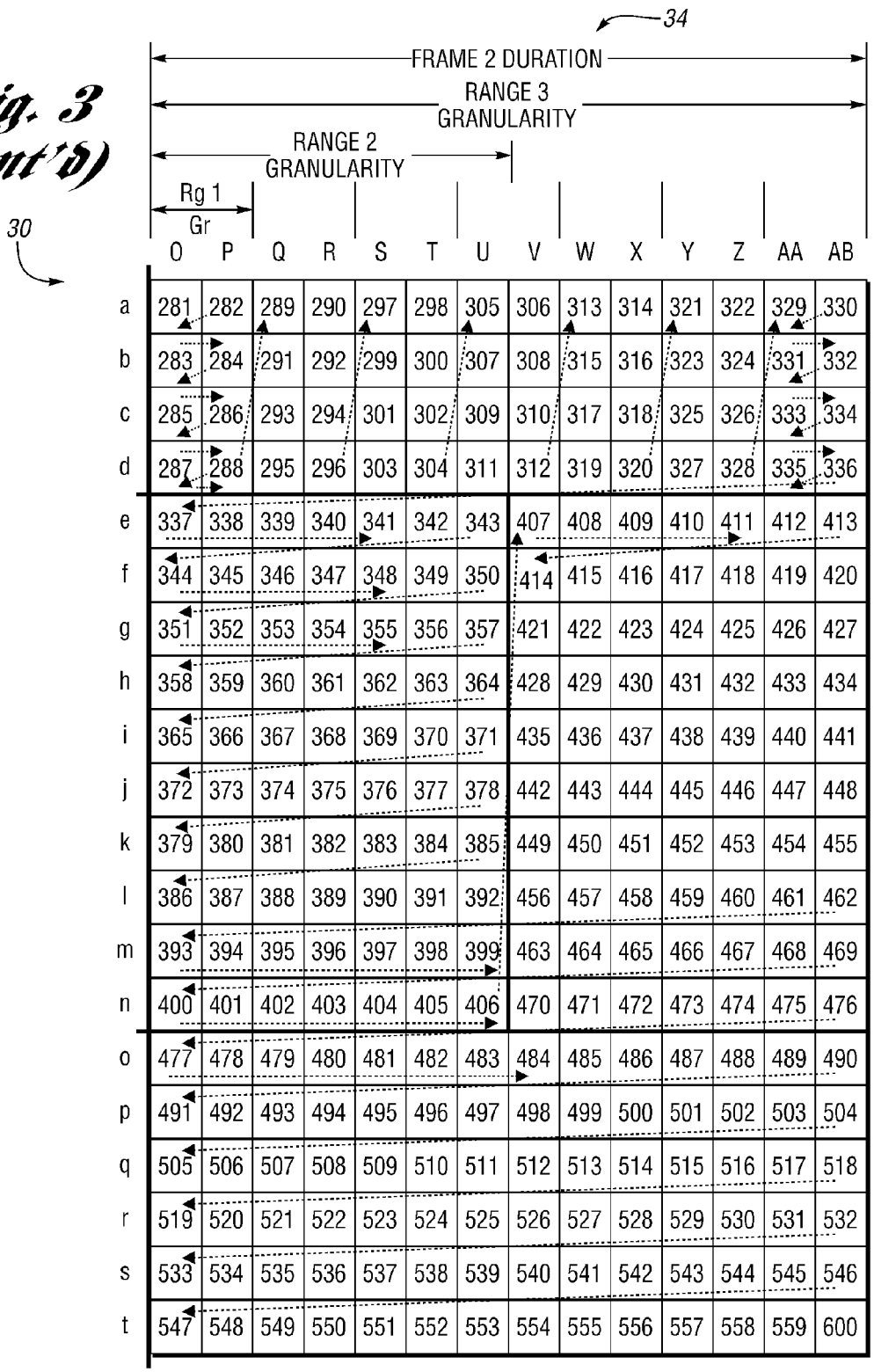

METHOD AND SYSTEM OPERABLE TO FACILITATE SIGNAL TRANSPORT OVER A NETWORK

CROSS-REFERENCE TO RELATED APPLICATIONS

This application claims the benefit of provisional application 61/266,653, filed Dec. 4, 2009, the disclosure of which is hereby incorporated in its entirety by reference.

BACKGROUND OF THE INVENTION

1. Technical Field

The present invention relates to scheduling transport of data over a network, such as but not limited to scheduling transport over a network having network space allocated according to a two-dimensional MAP defined as a function of frequency and time domains.

2. Background

A network may be configured to transmit data within a range of frequency, which is commonly referred to as the bandwidth of the network. Within that frequency range, minislots, data slots, data units or other transmission units may be used to represent portions of the frequency used at a particular time to support transmission of a particular piece of data. The size of the minislots may be quantified in bits and/or bytes, e.g., see a minislot defined according to the Data Over Cable Service Interface Specification (DOCSIS). The number of minislots available at a particular instance in time may be used to define the network space of the network, i.e., the amount of data transfer the network can support at any one particular instance in time.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

Figure 1:
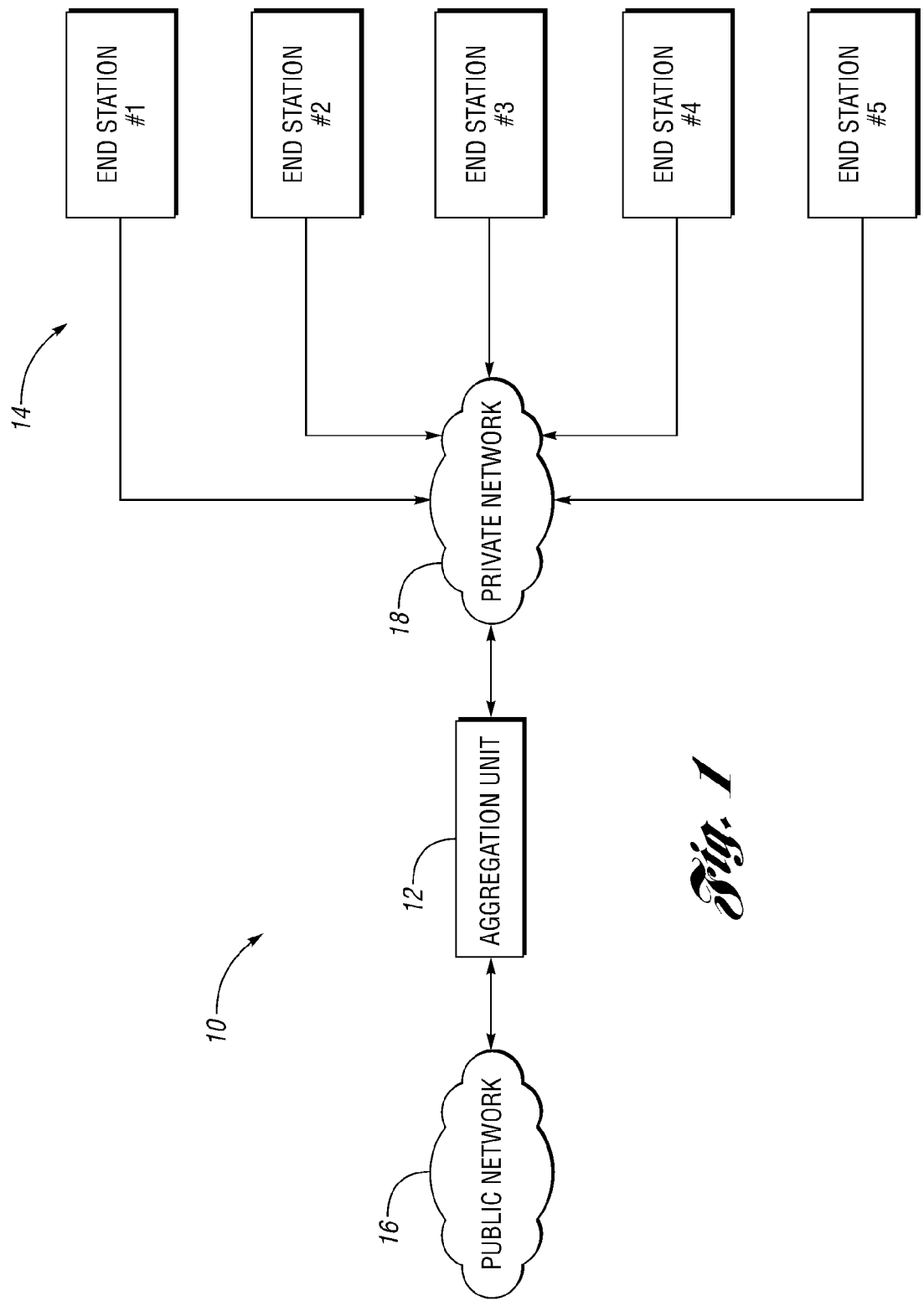
FIG. 1 illustrates a scheduling system in accordance with one non-limiting aspect of the present invention.

FIG. 1 illustrates a scheduling system 10 in accordance with one non-limiting aspect of the present invention. The system 10 may operate in a manner similar to the system described in U.S. patent application Ser. No. 12/826,889, entitled Multi-Tier Polling, filed Jun. 30, 2010, the disclosure of which is hereby incorporated in its entirety by reference. The system includes an aggregating unit 12 that cooperates with a plurality of end stations 14 to facilitate any number of electronic, communication-based services. The aggregating unit 12 may be operable to poll each end station 14 individually and adaptively such that polling messages or other types of polling related transmissions may be individually communicated from the aggregating unit 12 to selective ones of the end stations 14 at selective polling intervals. One non-limiting aspect of the present contemplates relying on this adaptive polling capability to facilitate management of network space.

The aggregating unit 12 may be any type of device operable to facilitate scheduling transmission between a public network 16 and a private network 18. The private network 18 may be operable to support private communications between the aggregating unit 12 and the ends stations 14, such as over a closed network or a private virtual network. The communications may be executed through out-of-band (OOB) messaging or other messaging transmission media and/or protocols operable to facilitate communications between the aggregating unit 12 and the end stations 14. The public network 16 designates the Internet or other potentially less secure or non-proprietary networks over which the end stations 14 may transmit signals for receipt by other devices. The end stations 14 may transmit data according to the OOB or a private protocol, such as to transmit polling related responses/requests, and/or according to protocols used to support IP related communications over the public network 16.

The aggregating unit 12 is shown as a gateway between the public and private networks 16, 18 for exemplary purposes. The aggregating unit 12 need not act as a gateway and the present invention is not intended to be limited to the aggregating unit 12 only supporting communications between public and private networks 16, 18, as communications may be facilitated over entirely public and/or private networks 16, 18. The present invention contemplates its use in many environments where it may be desirable to manage network space by facilitating scheduling of communications sourced from one or more of the end stations 14. The aggregating unit 12 and the end stations 14 may correspond with any type of electronic device and/or logically executing unit and the networks 16, 18 may corresponding with any type or combination of wireline and wireless networks, including but not limited to those associated with cable, satellite, or network television; cellular, wireless, or wireline phone communications; and wireless or wireline data transmissions.

The present invention is predominately described with respect to a cable television related configuration where the aggregating unit 12 may be a cable modem termination system (CMTS) and the private network 18 may correspond with a wireline, cable network provided to a subscriber's home where the end stations 14 may correspond with a cable modem, media terminal adaptor (MTA), settop box (STB), television, or other device desiring data communications over one or more of the networks to support cable related services, such as according to communications executed according to the Data Over Cable Service Interface Specification (DOCSIS). Of course, the present invention is not limited to cable related services or cable dependent communications and fully contemplates its application within non-cable environments.

One or more of the end stations 14 may be provided in a subscriber's home, or elsewhere in the event the end station 14 is a mobile device (e.g., PDA, mobile phone, netbook, tablet, etc.), such that it may be operable to provide or otherwise facilitate access to any number or type of services, such as but not limited to Voice over Internet Protocol (VoIP), channel surfing (e.g., changing television channels tuned to video streams and/or a QAM or IP signaling stream), and file upload/download through P2P or other operations. One non-limiting aspect of the present invention contemplates managing the processing performed by the end stations 14 and/or aggregating unit 12 to support these and other data transmission dependent services.

Each of the aggregating unit 12 and the end stations 14 may include a memory, processor, I/O and/or other features necessary to implement the operations contemplated by the present invention. The memory may store code or other computer readable information to be executed with the processor. The stored code may include a layered operating system or architecture to support decoupling of the MAC and PHY layers, such as in a manner described in U.S. patent application Ser. No. 12/827,496 entitled System and Method of Decoupling Media Access Control (MAC) and Physical (PHY) Operating Layers, filed Jun. 30, 2010, the disclosure of which is hereby incorporated by reference in its entirety. While not shown, each of the aggregating unit and the end stations may rely in the I/O to support a man-machine interface (MMI), such as to receive an input from a user or from another device and to facilitate transporting and receiving data over the network.

In accordance with one non-limiting aspect of the present invention the aggregating unit 12 and/or end stations 14 may operate with code having a convergence layer. The convergence layer may be a logically executing layer configured to decouple MAC and PHY layers. The convergence layer may be added or otherwise integrated into a layered based architecture used by one or more of the aggregating unit 12 and the end stations 14 to facilitate data input and output, such as but not limited to layered based architectures organized according Operating System Interconnection (OSI) standard, DOCSIS, IEEE 802.11 standard for wireless local area networks (WLAN), IEEE 802.16 for wireless networks (WiMax), code/frequency/time division multiple access code (CDMA/FDMA/TDMA) standards for telephony communications and/or other layered based architectures and standards.

Figure 2:
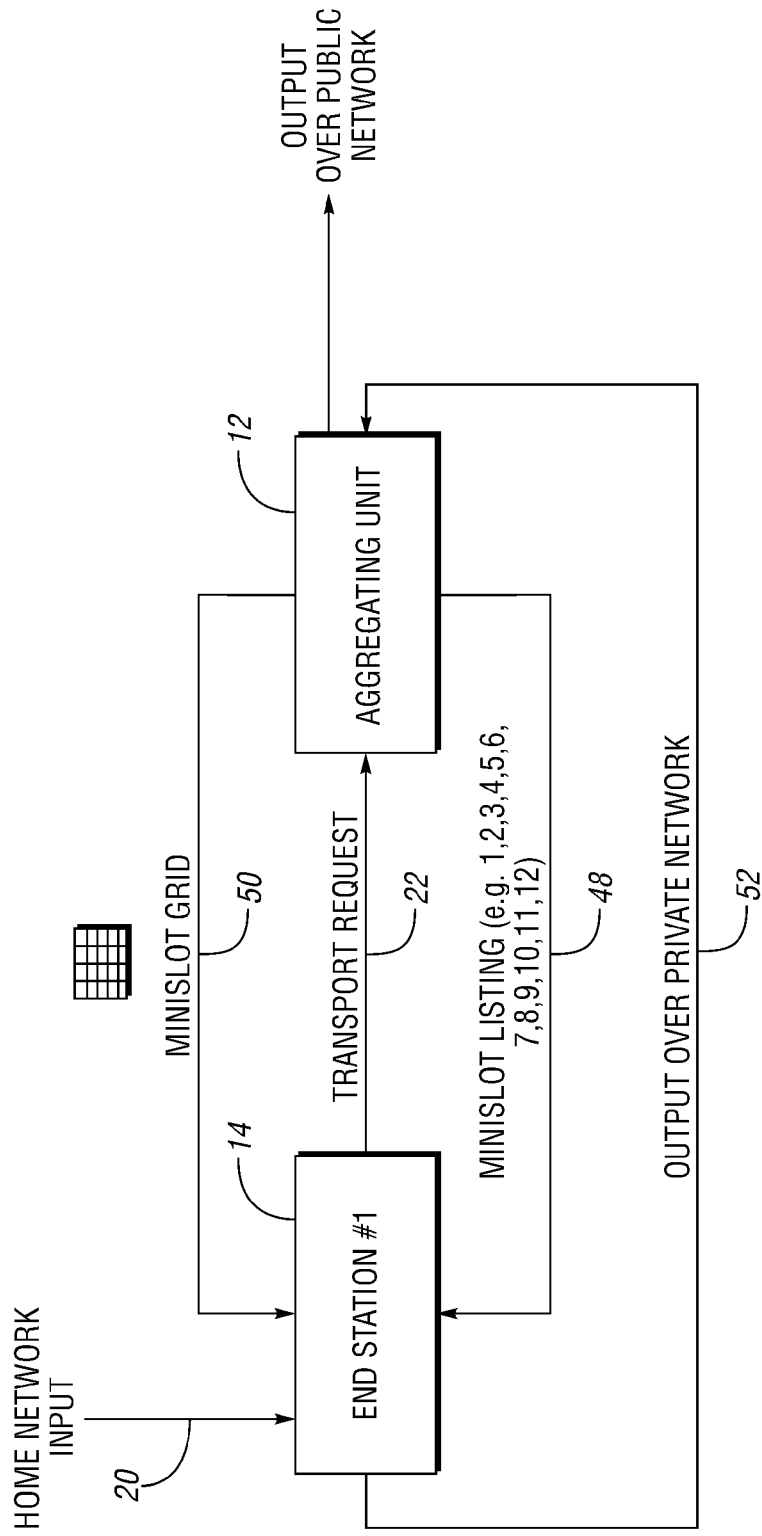
FIG. 2 schematically illustrates operation of the scheduling system in accordance with one non-limiting aspect of the present invention.

FIG. 2 schematically illustrates operation of the scheduling system 10 in accordance with one non-limiting aspect of the present invention where an interaction between one of the end stations 14 and the aggregating unit 12 is described. This illustration is provided for exemplary purposes and to demonstrate a number of possible operations contemplated by the present invention to facilitate scheduling of network space and resources. The aggregating unit 12 may be operable to repeat some or all of the described operations with any number of end stations 14, optionally at the same time. The illustrated operations correspond with a scenario where the end station 14 receives a transport input 20 to transmit one or more data packets over the public network 16 to which it issues a corresponding transport request 22 to the aggregating unit 12 to schedule the transport thereof.

The transport input 20 is shown to be received from a device (not shown) connected to a home network that is also connected to the end station 14. This scenario may arise through user interaction with a computer, STB, MTA, VoIP phone, etc, or other element connected to the home network that results in use of the end station 14 to support communication over the private and/or public networks. Of course, the present invention fully contemplates the end station 14 itself having an MMI or other input through which transport inputs 20 may be received.

Prior to actually transporting data packets indicated in the transport input 20, the end stations 14 may process the input 20 to assess a size of the desired transport, e.g., the number of data packets being transported, which may be determined from information included within the request or dynamically as data is being output after being scheduled for transport. The number of data packets may be represented according to any suitably sized data packet datum and may specify streaming or other continuous transmissions instead of a defined number/size of data packets. While the number and/or size of the data packets, signals, and/or other information is commonly referred to herein as a data packet, this nomenclature is not intended to limit the scope and contemplation of the present invention. This is done to simplify the explanation as the present invention fully contemplates scheduling any type of electronic transport over a network where network resources are allocated according to a scheduled-based mechanism.

The end stations 14 may be further operable to assess service requirements associated with the transport input 20, e.g., traffic types or traffic classification criteria. The end station 14 may be operable to support data transport for any number of traffic types and classifications, such as but not limited to those associated with VoIP, content stream, web/data download, gaming, etc. Some traffic types, such as web/data download may be tolerant to slower data transmission (greater latency) than other traffic types, such as those associated with VoIP and gaming, which may require faster data transmission than VoIP. Others may require more robustness or efficiency. These latency and other requirements may be characterized as desired operational requirements at least in so far as the services may still be provided even if the service requirements are not being met, e.g., gaming may still take place if the desired latency thresholds are exceed at the expense of user satisfaction, input/output delays, etc. As such, the service requirements need not necessarily prevent transport during situations in which network resources are unable to properly support the latency requirements.

Figure 3:
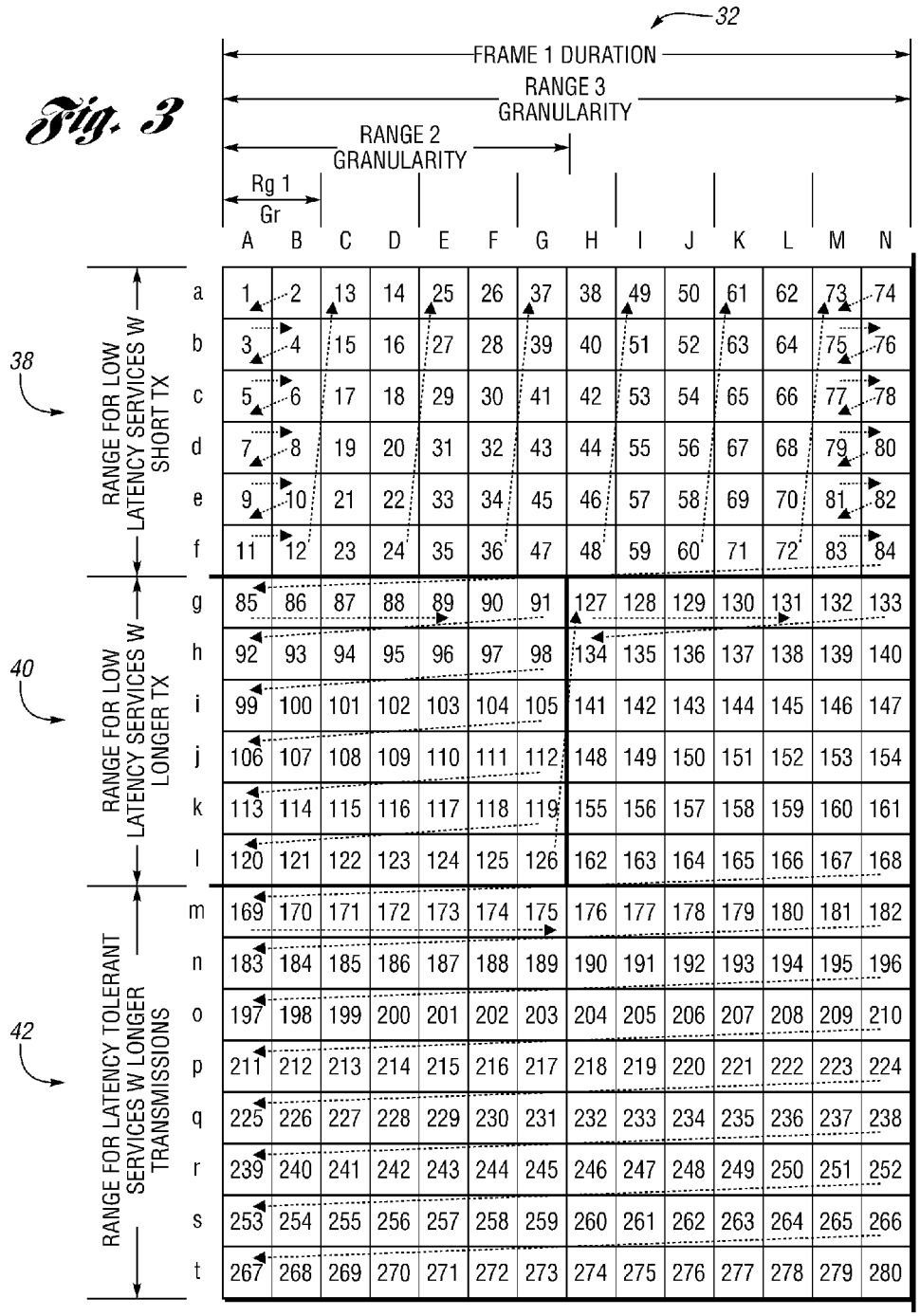
FIG. 3 illustrates a MAP in accordance with one non-limiting aspect of the present invention.

FIG. 3 illustrates a MAP 30 used to represent network resources of the public and/or private networks 16, 18 in accordance with one non-limiting aspect of the present invention. The MAP 30 may be generated by the aggregating unit 12 to represent network resources or space that is available to facilitate network-based data transmission. The MAP 30 two-dimensionally illustrates available network resources as function of frequency and time. The frequency and time domains are shown to be further defined as frequency intervals (a-t), referred to as sub-channels, and time intervals (A-AB), referred to as sub-frames of larger frames #1 and #2. (A frame may be considered to be a duration, in number of sub-frames, over which a set of bandwidth allocation rules are defined.) The MAP 30 is interchangeable referred to herein as a minislot grid in that an intersection of each sub-channel and sub-frame corresponds with a minislot (1-530). Each minislot (1-530) may be used to represent a capacity unit comprised of a number of sub-carriers over time.

The sub-carriers may be individually defined frequency segments modulated to transfer date within a larger frequency spectrum of the corresponding sub-channel. The sub-carries may be a more granular or basic level of communication where the amount of data each sub-carrier may be able to transport can vary according to frequency, network characteristics, etc. The sub-carriers may be grouped and continuously re-grouped according to capacity variances to form sub-channels of constant capacity. One non-limiting aspect of the present invention contemplates collecting or otherwise arranging the sub-carriers such that each minislot totals the same capacity, regardless of the actual number of sub-carriers being used to form each minislot.

The frequency (sub-channel) and time (sub-frame) coordinates represented along the vertical axis and the horizontal axis respectively may be used to identify a starting frequency (start sub-channel) and an encompassed frequency range (number of sub-channels) as well as a start time (start sub-frame) and a duration (number of sub-frames). These MAP designations may be defined according to DOCSIS, and optionally, according to the MAC Management Message that a DOCSIS enabled CMTS would use to allocate transmission opportunities to a cable modems. The aggregating unit 12 or other device associated with the networks 16, 18 may be responsible for supporting the MAP 30 and coordinating scheduling and allocation of the related resources in order to enable the data communications required by the end stations 14 to support the provided services. In order for the data packets to be transmitted over the network 16, 18, the corresponding transport input must be mapped to the two-dimensional MAP 30, or a similar two-dimensional MAP, in the event the data is being transmitted over the type of network 16, 18 that allocates resources in two-dimensions as function of frequency and time.

The two-dimensional mapping contemplated by the present invention may require detailed knowledge about available sub-carriers and related processing in order to properly group the sub-carriers into the same sized (capacity) sub-channels, including capabilities to monitor available network resources and continuously changing characteristics of the sub-carriers (as one skilled in the art will appreciate, the amount of data each sub-carrier can transport may vary over time according to any number of transient network conditions, such as but not limited to network congestion and utilization levels). The two-dimensional mapping may also require knowledge of the two-dimensional MAP parameters such as the MAP duration according to an integer number of frames and/or sub-frames and the number of sub-channels to be used for transmission. These parameters are configurable to achieve the intended performance (i.e. latency, robustness, efficiency etc.).

One non-limiting aspect of the present invention contemplates dividing or segmenting the MAP 30, or more particularly the frames 32, 34 comprising the MAP 30, into a plurality of ranges, labeled as first, second, and third ranges 38, 40, 42. The ranges 38, 40, 42 may be portions of the MAP 30 and/or individual frames 32, 34, i.e., network resources, set aside or otherwise reserved by the aggregating unit 12 for certain traffic types or other data transports having particular classification criteria, e.g., latency, robustness, efficiency, etc. A first traffic type, such as gaming or the like, that tolerates a first amount of latency may be assigned to the first range 38. A second traffic type, such as VoIP or the like, that tolerates a second amount of latency may be greater than the first amount may be assigned to the second range 40. A third traffic type, such as web/data download or the like, that tolerates a third amount of latency greater than the second amount may be assigned to the third range 42. While some ranges are reserved for certain traffic types, other traffic types may be scheduled thereto under some conditions, such as if other ranges are available and the desired range is full or access to the range is unavailable for an longer period of time whereby the transport could be completed earlier or more efficiently if scheduled to one of the other ranges.

The aggregating unit 12 may include an algorithm operable to schedule data packets for transport during one more minislots (1-530) identified within each of the ranges 38, 40, 42. The aggregating unit 12 may allocate minislots (1-530) for a particular data packet transport according to reference IDs (1-530) assigned to each of the minislots (1-530) within the range dedicated to support transport of the corresponding traffic type/classification criteria. Optionally, the aggregating unit 12 may be operable to schedule the minislots (1-530) according to a distribution route (shown with arrows in each range 38, 40, 42). Different distribution routes may be used for the different ranges depending on whether it is more desirable to favor transport speed over transport efficiency/robust or transport efficiency/reliability over transport speed. (Transports carried out over less sub-frames tend to complete faster than transports carried over more sub-frames but with less efficiency/reliability since temporal disruption are more likely to affect data transported across more sub-channels than sub-frames.)

The minislots found within in the first range are shown to have been set aside to support transport of data packets used to support services requiring low latency or high robustness using short packets. A first range distribution route may be used to schedule the minislots within the first range 38 in a pattern that generally extends horizontally and then spirals downwardly. This type of distribution route may be characterized as having a double-run in that the minislots are sequentially and equally scheduled horizontally across two sub-frames (A, B) within a first sub-channel (a) before being scheduled downwards one sub-channel (b) to the next two sub-frames (A, B) covering the available sub-channels in the sub-channel range (a, b, c, d, e, f) before being scheduled in the same manner in the next sub-frame (C) to repeat the same process. The slope, e.g. rise over run, of the first range distribution route is shown to be 0.5 since two minislots are populated horizontally before being shifted one minislot vertically.

The minislots found within in the second range 40 are shown to have been set aside to support transport of data packets used to support services requiring medium latency or medium robustness. A second range distribution route may be used to schedule the minislots within the second range 40 in a pattern that generally extends horizontally across more than sub-frames than the route of the first range 38 before shifting vertically. This type of distribution route may be characterized as having a greater run than rise in that the minislots are sequentially scheduled horizontally across the available sub-frames (A, B, C, D, E, F, G) within a selected sub-channel (g) before being scheduled in the same horizontal manner (A, B, C, D, E, F, G) across the next available sub-channel (h). Once sub-channel (1) is scheduled in a similar manner, the second distribution route shifts upwardly back to sub-channel (g) and repeats. This may be done in order to balance the speed versus latency of services supported with the second range. The slope, i.e. rise over run, of the second range 40 distribution route is shown to be 0.1429 since seven minislots are populated horizontally before being shifted one minislot vertically.

The minislots found within in the third range 42 are shown to have been set aside to support transport of data packets used to support high latency and/or high efficiency services. A third range distribution route may be used to schedule the minislots of the third range 42 in a pattern that generally extends horizontally and then downwardly. This type of distribution route may be characterized as having a greater run than rise in that the minislots are sequentially scheduled horizontally across all the available sub-frames (A, B, C, D, E, F, G, H, K, I, J, L, M, N) with a selected sub-channel (m) before being scheduled in the same horizontal manner frames (A, B, C, D, E, F, G, H, K, I, J, L, M, N) across the next available sub-channel (n). This may be done in order to maximize efficiency/reliability of services supported with the third range. The slope, e.g. rise over run, of the third range distribution route is shown to be 0.0714 since fourteen minislots are populated horizontally before being shifted one minislot vertically.

Frame #2 34 may include the ranges 38, 40, 42 being distributed in the same manner as Frame #1 31, or as illustrated, in a different manner, such as by increasing the size of the second range 40 when demand for the first and third ranges 38, 42 decreases or demand for the second range increases 40. Frame #2 34 is shown to have the same distribution routes within each of the corresponding ranges 38, 42, 44 in so far as having the same slope but this too may be varied depending on demand or other parameters. Each distribution route is shown to comprising at least a run of two sub-frames since, at least in many cases, one sub-frame will be needed to support transport of the packet's preamble in order to synchronize transport of the packets payload in at least one subsequent sub-frame. It may be preferable to include at least a portion of the payload within the same sub-channel before shifting down one sub-channel from the preamble but it is not required, i.e., the distribution route of the first range 38, for example, may proceed with a greater rise than run by shifting downwardly through two or more sub-channels before shifting rightward one sub-frame, which may be beneficial if there no preamble is required.

Returning to FIG. 2, the aggregating unit 12 schedules data packet transport upon receipt of the transport request message 22 from the end station 14. A listing message 48 listing the minislots (1-530) scheduled to support the corresponding transport may then be sent from the aggregating unit 12 to the end station 14. This scheduling is shown to correspond with the data packet transport requiring multiple minislots (1-530); however, it may be possible in some cases to transport the data packet within a single minislot (1-530), depending on the size and capabilities of each minislot (1-530), which may vary depending on the network configuration and space. The listing message 48 may list a number of minislots (1-530) scheduled to support the transport according to the minislot reference ID assigned thereto. The listing message 48 is considered to be a one-dimensional listing/instruction set since the actual sub-channel and sub-frames corresponding with the scheduled minislots (1-530) are not actually identified within the listing message 48. The illustrated listing messaging 48 only specifies a reference location within the minislot grid (MAP 30), however, the present invention fully contemplates include such information with in the listing message 48 if desired.

A grid message 50 is sent by the aggregating unit 12 with a description of the different ranges of frequency corresponding to a specific minislot routing mechanism i.e. MAP 30. The end station 14 compares the reference IDs included in the listing message 48 to the MAP 30. The grid message 50 may be transmitted to the end stations 14 in advance of the minislot listing message 48, at the same time, or thereafter as long as there is sufficient time to prepare and execute operations required to support transport at the appointed time. The minislot grid message 50 may include the MAP 30 illustrated in FIG. 3 or another coordinating system that the end station 14 can use to determine the appropriate two-dimensional transmission times and frequencies for each of the minislots references included within the listing message 48, thereby allowing the aggregating unit 12 to instruct delivery without specifically identifying sub-channels and sub-frames for each transport request.

One non-limiting aspect of the present invention contemplates limiting some of the processing demands of the aggregating unit 12 by allowing the aggregating unit 12 to periodically transmit grid messages 50 instead of doing so each time a transport request is received. Optionally, the grid message 50 may be used for prolonged periods of time and/or until sufficient changes occur in network resources that required the adjustment thereof. The separate use of the grid and listing messages 48, 50 allows the present invention to generate one-dimensional coordinates when scheduling transports that require two-dimensional coordinates due to the ability to the end stations 14 to map the one-dimensional coordinates to two-dimensional coordinates using the layouts provided within the minislot grid messages 50.

Once the end station 14 maps the one-dimensional coordinates to the two-dimensional coordinates (sub-channels and sub-frames) required to transport over the network 16, 18, the corresponding data packets are transported over the private network 18 to the aggregating unit 12 for relay to the public network 16. The time and frequency of the transport 52 may be same over the public and private networks 16, 18, i.e., according to the mapped to two-dimensional coordinates, such as if the public network 16 is under the control of a common entity or is otherwise considered to be part of the private network 18. Optionally, the data packets may be transported to the aggregating unit 12 according to some other methodology which embeds the corresponding time and frequency information mapped to by the end stations 14 within the transmitted data packets. Each end station 14 and the aggregating unit 12 may continue to operate over time in this manner such that each end station 14, for each desired transport, may request scheduling of the corresponding data packets from the aggregating unit 12. While the foregoing presumes availability of the sub-frame (A), the scheduling of any one or more transports may be slotted to any other portion of the MAP 30 and need always begin with the earliest available sub-frame (A), i.e., it can start anywhere within one of the available frames (Frame #1, Frame #2).

The aggregating unit 12 may be operable to dynamically monitor network congestion levels, available resources (failure, construction, etc.), and other factors to assess whether the ranges allocated to certain traffic types or classification criteria are sufficient and whether more or fewer ranges are required. In the event network congestion levels change or quality of service requirements are adjusted, the aggregating unit 12 may adjust the divisions between the ranges 38, 40, 42, either by adding or subtracting sub-channels and/or sub-frames. Likewise, in the event new traffic classification criteria are to be supported or are only supported during certain periods of time, the ranges 38, 40, 42 may be altered in a corresponding manner. The ranges 38, 40, 42 are illustrated as being non-overlapping along the horizontal axis in that one range 38, 40, 42 does not extend into another range 38, 40, 42. However, due to the dynamic capabilities of the present invention, the ranges 38, 40, 42 may be adjusted to overlap along the horizontal axis, e.g., in event one range 38, 40, 42 is scheduled for expansion at a period to occur after expiration of a yet to be executed minislot (1-530) assigned to another range 38, 40, 42 for the same sub-channel.

As supported above, one non-limiting aspect of the present invention relates to segmentation of a two dimensional physical layer environment into regions optimized to a specific service requirement. A one-dimensional scheduling method may be used to allocate data over each region in the two dimensional environment. A set of rules of how to populate data in each region is illustrated. The set of data population rules enables the translation of data scheduling in a two dimensional environment using a one-dimensional method.

One non-limiting aspect of the present invention relates to a scheduling mechanism operable to allocate data in a two-dimensional environment that also allows for decoupling of the MAC and the PHY which reduces complexity. In addition, the optimizing regions allow transmission of the traffic characteristics and service requirements of each traffic types to be met. The present invention can, in some respects, provide simplifications that can be utilized to reduce the cost and complexity of networking components, including but not limited to headend and CPE equipment in cable, wireless and other industries where two dimensional multiple access systems are used.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for use with a plurality of end stations, the end stations being operable with at least one of a user and a user device to output data packets for transmission over the network, the plurality of end stations generating data transmission requests when desiring to transport data packets over a network and outputting the data packets according to data transport instructions received in response thereto, the system comprising:

an aggregating unit operable in response to receipt of the data transmission requests to provide the data transport instructions to the plurality of end stations, the aggregating unit generating the data transport instructions such that the data packets are scheduled for transport according to network space available on the network, the network space being finite and defined relative to a plurality of intersecting frequency and time intervals, the aggregating unit scheduling data packets associated with a first classification criteria for transport across a first number of frequency intervals and a first number of time intervals and a second traffic classification criteria for transport across a second number of frequency intervals and a second number of time intervals, the second number of time intervals being greater than the first number of time intervals;

wherein:

the aggregating unit provides the end stations with a minislot grid that references each intersection of the frequency and time intervals as a minislot having a unique reference ID;

the transport instructions include a listing of references IDs for the minislots scheduled to be used for transporting the data packets; and the end stations cross-reference the reference IDs with the minislot grid to determine time and frequency intervals during which the data packets associated therewith are scheduled for transport.

2. The system of claim 1 wherein the transport instructions do not identify time and frequency intervals, thereby requiring the end station to use the minislot grid to identify the time and frequency intervals during which the data packets are scheduled for transport.

3. The system of claim 1 wherein the aggregating unit provides the minislot grid to the end stations prior to receiving the data transmission requests.

4. A method of scheduling transport of data packets over a network having network space allocated according to a two-dimensional MAP defined as a function of frequency and time domains, the method comprising:

scheduling transport of the data packets to occur within one of at least a first, second, and third range of the MAP depending on whether a traffic classification criteria of the data packet is defined to operate with one of a first, second, and third amount of latency wherein data packets defined to operate with the first amount of latency are scheduled for transport within the first range, data packets defined to operate with the second amount of latency are scheduled for transport within the second range, and data packets defined to operate with the third amount of latency are scheduled for transport within the third range;

scheduling each data packet to be transported either entirely during one minislot or segmentally during more than one minislot, each minislot being defined within each of the first, second, and third ranges of the MAP to correspond with intersection of one sub-channel defined in the frequency domain and one sub-frame defined in the time domain; and scheduling each data packet segmented to be transported over more than one minislot according to a distribution route, each distribution route representing a sequence by which minislots within the first, second, and third ranges are to be scheduled segments of the data packet.

5. The method of claim 4 further comprising scheduling each data packet segmented for transport over more than one minislot within the first range such that the distribution route of each includes a run less than a run of the second range, the rise representing the distribution route traversing sub-channels and the run representing the distribution route traversing sub-frames.

6. The method of claim 4 further comprising scheduling transport of each data packet segmented for transport over more than one minislot within the second range such that the distribution route of each includes a run greater than at least three times a rise, the rise representing the distribution route traversing sub-channels and the run representing the distribution route traversing sub-frames.

7. The method of claim 4 further comprising scheduling transport of each data packet segmented for transport over more than one minislot within the third range such that the distribution route of each includes a run greater than at least five times a rise, the rise representing the distribution route traversing sub-channels and the run representing the distribution route traversing sub-frames.

8. The method of claim 4 further comprising:

scheduling transport of each data packet segmented for transport over more than one minislot within the first range such that the corresponding distribution route includes a rise greater than a z value times a run, the rise representing the distribution route traversing sub-channels and the run representing the distribution route traversing sub-frames;

scheduling transport of each data packet segmented for transport over more than one minislot within the second range such that the corresponding distribution route includes a run greater than an x value times a rise;

scheduling transport of each data packet segmented for transport over more than one minislot within the third range such that the corresponding distribution route includes a run greater than a y value times a rise; and wherein the y value is greater than the x value.

9. The method of claim 8 wherein the x value is seven, the y value is fourteen, and the z value is six.

10. The method of claim 8 wherein the y value is at least an integer multiple of the x value.

11. A method of scheduling transport of data packets over a network having network space allocated according to a two-dimensional MAP defined as a function of frequency and time domains, the method comprising:

scheduling transport of the data packets to occur within one of at least a first, second, and third range of the MAP depending on whether a traffic classification criteria of the data packet is defined to operate with one of a first, second, and third amount of latency wherein data packets defined to operate with the first amount of latency are scheduled for transport within the first range, data packets defined to operate with the second amount of latency are scheduled for transport within the second range, and data packets defined to operate with the third amount of latency are scheduled for transport within the third range;

scheduling each data packet to be transported either entirely during one minislot or segmentally during more than one minislot, each minislot being defined within each of the first, second, and third ranges of the MAP to correspond with intersection of one sub-channel defined in the frequency domain and one sub-frame defined in the time domain;

providing end stations scheduled to transport the data packets with a minislot grid that references the intersections used to define each minislot with a different reference ID; and providing end stations with a listing of reference IDs to be used when transporting the data packets, the end stations cross-referencing the reference IDs with the minislot grid to determine portions of the time domain and frequency domain during which the data packets are scheduled to be transported.

12. The method of claim 11 further comprising scheduling transport of the data packets with an aggregating unit operable to instruct modems.

13. The method of claim 11 further comprising scheduling transport of the data packets such that the first amount of latency is less than the second amount of latency and the second amount of latency is less than the third amount of latency.

* * * * *